(12) United States Patent
Kolb et al.

(10) Patent No.: US 7,228,885 B2
(45) Date of Patent: Jun. 12, 2007

(54) HEAT EXCHANGER PACKAGE WITH SPLIT RADIATOR AND SPLIT CHARGE AIR COOLER

(75) Inventors: John A Kolb, Old Lyme, CT (US); John Morais, Meriden, CT (US)

(73) Assignee: Proliance International, Inc., New Haven, CT (US)

( * ) Notice: Subject to any disclaimer, the term of this patent is extended or adjusted under 35 U.S.C. 154(b) by 251 days.

(21) Appl. No.: 10/723,881

(22) Filed: Nov. 26, 2003

(65) Prior Publication Data

US 2005/0109484 A1    May 26, 2005

(51) Int. Cl.
*B60H 1/00* (2006.01)
*F01P 3/18* (2006.01)
*F01P 3/20* (2006.01)

(52) U.S. Cl. .................. 165/42; 165/43; 165/51; 165/140; 60/599; 123/563

(58) Field of Classification Search ........... 165/41, 165/42, 43, 44, 51, 140, 146; 123/41.48, 123/563; 60/599
See application file for complete search history.

(56) References Cited

U.S. PATENT DOCUMENTS

| | | | |
|---|---|---|---|
| 4,236,492 A | 12/1980 | Tholen | |
| 4,736,727 A | 4/1988 | Williams | |
| 4,938,303 A | 7/1990 | Schaal et al. | |
| 5,046,550 A | 9/1991 | Boll et al. | |
| 5,046,554 A | 9/1991 | Iwasaki et al. | |
| 5,062,473 A | 11/1991 | Ostrand et al. | |
| 5,157,944 A | 10/1992 | Hughes et al. | |
| 5,234,051 A | 8/1993 | Weizenburger et al. | |
| 5,267,624 A | 12/1993 | Christensen | |
| 5,316,079 A | 5/1994 | Hedeen | |
| 5,353,757 A | 10/1994 | Susa et al. | |
| 5,526,873 A | 6/1996 | Marsais et al. | |
| 5,566,748 A | 10/1996 | Christensen | |
| 5,657,817 A | 8/1997 | Heine et al. | |
| 6,223,811 B1 | 5/2001 | Kodumudi et al. | |
| 6,408,939 B1 | 6/2002 | Sugimoto et al. | |
| 6,615,604 B2 | 9/2003 | Neufang | |

(Continued)

FOREIGN PATENT DOCUMENTS

EP    0522288 A1    4/1992

(Continued)

*Primary Examiner*—Ljiljana Ciric
(74) *Attorney, Agent, or Firm*—DeLio & Peterson, LLC; Peter W. Peterson

(57) ABSTRACT

A combined radiator and charge air cooler package includes a radiator having upper and lower portions for cooling engine coolant and a charge air cooler having upper and lower portions for cooling charge air. The upper charge air cooler portion is disposed in overlapping relationship and adjacent to the upper radiator portion, and the lower charge air cooler portion is disposed in overlapping relationship and adjacent to the lower radiator portion. The upper charge air cooler portion and the lower radiator portion are aligned in a first plane, and the lower charge air cooler portion and the upper radiator portion are aligned in a second plane, behind the first plane. Ambient cooling air may flow in series through the upper charge air cooler portion and the upper radiator portion, and also through the lower charge air cooler portion and the lower radiator portion.

30 Claims, 11 Drawing Sheets

U.S. PATENT DOCUMENTS

| | | |
|---|---|---|
| 6,957,689 B2 | 10/2005 | Ambros et al. |
| 2002/0020365 A1 | 2/2002 | Wooldridge |
| 2003/0106669 A1 | 6/2003 | Ambros et al. |
| 2004/0104007 A1 | 6/2004 | Kolb |

FOREIGN PATENT DOCUMENTS

| | | |
|---|---|---|
| EP | 0522471 A1 | 1/1993 |
| JP | 11-264688 | 9/1999 |

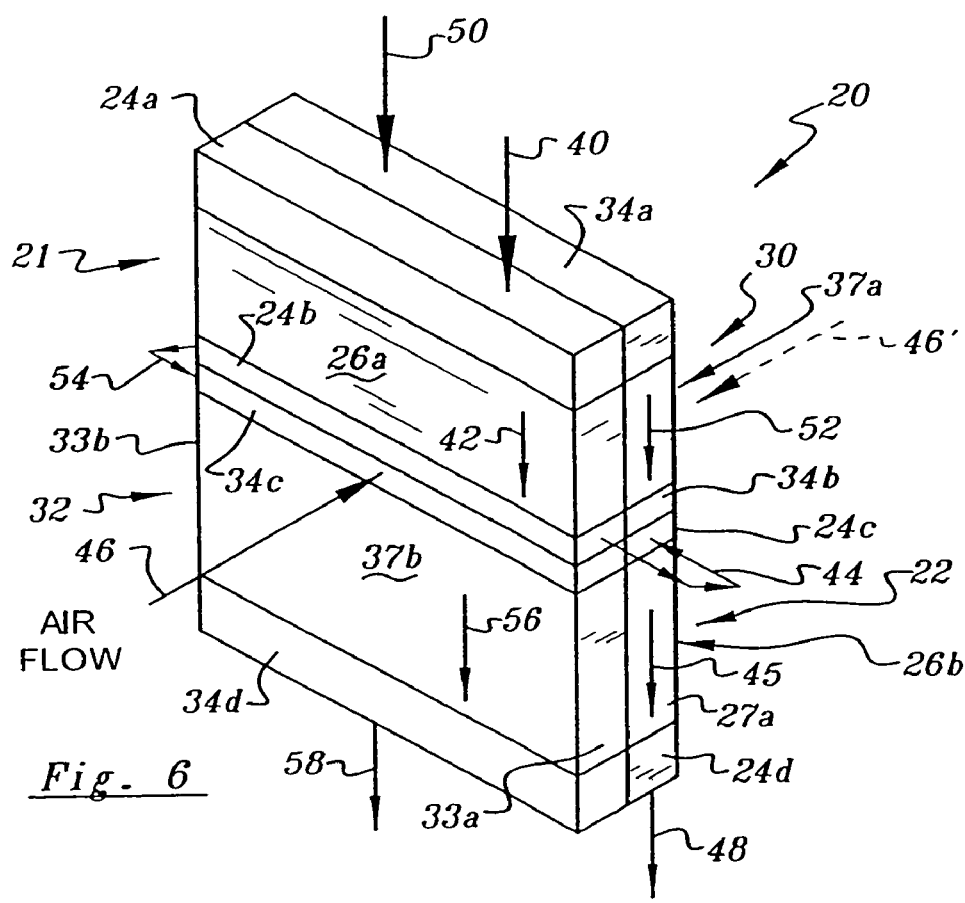
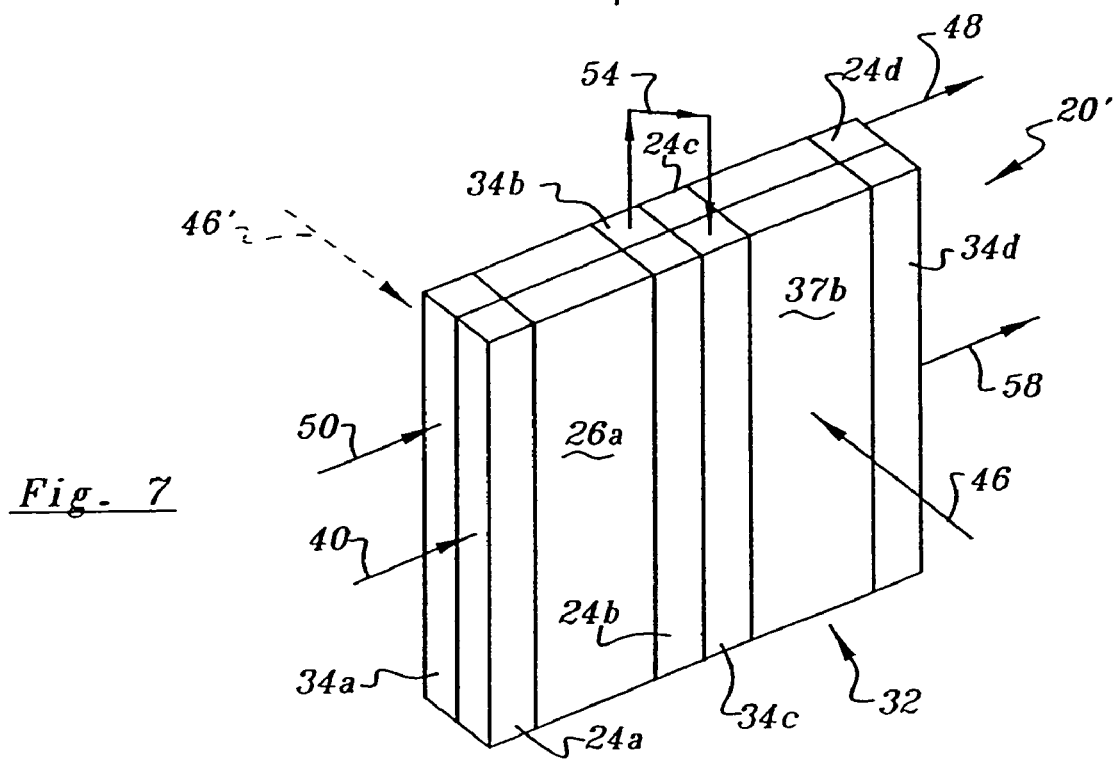
Fig. 6
Fig. 7

HEAT EXCHANGER PACKAGE WITH SPLIT RADIATOR AND SPLIT CHARGE AIR COOLER

BACKGROUND OF INVENTION

1. Field of the Invention

The invention relates to heat exchanger devices for cooling fluids used in an engine of a motor vehicle, and more particularly, to a heat exchanger package including a coupled radiator and charge air cooler for an engine of a heavy-duty highway truck or bus.

2. Description of Related Art

Heat exchanger packages comprising a radiator and a charge air cooler, also known as an intercooler, have been used for years in over the road highway trucks and buses and other heavy-duty motor vehicles. The radiator provides cooling for the engine coolant, usually a 50–50 solution of water and anti-freeze. The charge air cooler receives compressed, charge or intake air from the turbo- or super-charger and lowers its temperature before it enters the engine intake manifold, thereby making it denser, improving combustion, raising power output, improving fuel economy and reducing emissions. In order to optimize heat transfer in a given heat exchanger package size, the factors of cooling air flow, heat exchanger core restriction, cooling air flow split and cooling air approach and differential temperature must be balanced.

Numerous configurations of the radiator/charge air cooler heat exchanger package have been disclosed in the prior art. Placing both the radiator and charge air cooler side-by-side, so that the full frontal area of each of the cores are exposed to ambient cooling air, provides the best performance, but requires the largest package frontal area. Limitations in the frontal area of radiator and charge-air cooler heat exchanger packages have been sought in order to accommodate the smaller frontal area of motor vehicles, as a result of improved vehicle aerodynamics. Heat exchanger packages with smaller frontal areas have been disclosed for example in U.S. Pat. No. 4,737,727, U.S. patent application Publication No. 2003/0106669, and in U.S. patent application Ser. No. 10/289,513.

In another prior art radiator and charge air cooler heat exchanger package, depicted in FIG. 1, the charge air cooler is split between an upper unit 101 and a lower unit 103, disposed respectively behind and in front of radiator 107 with respect to the direction of cooling air flow 127. Radiator 107 has a conventional downflow-type tube and fin core 117 between upper tank 109a and lower tank 109b. Radiator 107 receives coolant 131 from the engine into upper tank 109a and the cooled engine coolant exits as 133 from the lower portion of lower tank 109b, to be transferred back to the engine. Both charge air cooler units 101, 103 are cross-flow type charge air coolers wherein the compressed charge air is flowed horizontally through the respective tube and fin cores 111, 113. Compressed, heated charge air 121 is first flowed into vertically oriented tank 105a of upper charge air cooler 101, through core 111 in direction 129a, and into vertical tank 105b. In unit 101, the charge air is cooled by air 127 as it exits the upper portion of radiator core 117. Thereafter, the partially cooled compressed charge air 123 is then transferred into vertical tank 105d of lower charge air cooler 103, where it is then flowed in horizontal direction 129b through core 113 and into vertical tank 105c, and thereafter exits 125 and flows to the engine intake manifold. In unit 103, the charge air is cooled by air 127 before it flows through the lower portion of radiator core 117. Notwithstanding its novel design, the heat exchanger package of FIG. 1 did not achieve good performance and did not go into normal production, to the inventor's knowledge. It has now been determined that the performance of the heat exchanger package of FIG. 1 suffered in large part due to excessive charge air pressure drop through the two charge air cooler units.

Thus there has been a long-felt need to achieve high performance in cooling both engine coolant and charge air, while observing strict limitations in charge air pressure drop and frontal area of a radiator/charge air cooler heat exchanger package.

SUMMARY OF INVENTION

Bearing in mind the problems and deficiencies of the prior art, it is therefore an object of the present invention to provide a combination radiator and charge air cooler which achieves high heat transfer performance with a minimal frontal area.

It is another object of the present invention to provide a heat exchanger package for cooling different fluids which minimizes the pressure loss to the fluids.

It is a further object of the present invention to provide a method of cooling fluids such as engine coolant and charge air used in the engine of a motor vehicle which optimizes heat transfer of those fluids to ambient cooling air.

The above and other objects, which will be apparent to those skilled in art, are achieved in the present invention which is directed to a heat exchanger apparatus comprising a first heat exchanger having two portions for cooling a first fluid. Each first heat exchanger portion has opposite front and rear faces through which ambient cooling air flows, opposite first and second ends adjacent the faces, and sides adjacent the faces between the first and second ends. The heat exchanger package further includes a second heat exchanger having two portions for cooling a second fluid. Each second heat exchanger portion has opposite front and rear faces through which air flows, opposite first and second ends adjacent the faces, and sides adjacent the faces between the first and second ends, and includes manifolds at the first and second ends and fluid-carrying tubes extending substantially directly therebetween.

One of the second heat exchanger portions is disposed in overlapping relationship and adjacent to one of the first heat exchanger portions, with the first and second ends of the one of the second heat exchanger portions being oriented in the same direction as the first and second ends of the one of the first heat exchanger portions. One face of the one of the first heat exchanger portions is disposed adjacent one face of the one of the second heat exchanger portions, such that the ambient cooling air may flow in series through the one of the first heat exchanger portions and the one of the second heat exchanger portions. The other of the second heat exchanger portions is disposed in overlapping relationship and adjacent to the other of the first heat exchanger portions, with the first and second ends of the other of the second heat exchanger portions being oriented in the same direction as the first and second ends of the other of the first heat exchanger portions. The other face of the other of the first heat exchanger portions is disposed adjacent one face of the other of the second heat exchanger portions, such that the ambient cooling air may flow in series through the other of the second heat exchanger portions and the other of the first heat exchanger portions.

The first heat exchanger portions are operatively connected such that the first fluid may flow between the second manifold of the one of the first heat exchanger portions and the first manifold of the other of the first heat exchanger portions. The second heat exchanger portions are operatively connected such that the second fluid may flow between the second manifold of the one of the second heat exchanger portions and the first manifold of the other of the second heat exchanger portions.

Preferably, the one of the first heat exchanger portions and the other of the second heat exchanger portions are disposed in substantially the same plane, and the other of the first heat exchanger portions and the one of the second heat exchanger portions are disposed in substantially the same plane.

The first heat exchanger portions may be operatively connected such that the first fluid may flow between the second manifold of the one of the first heat exchanger portions and the first manifold of the other of the first heat exchanger portions adjacent at least one side of the first heat exchanger portions, or around at least one side of the second heat exchanger portions. The second heat exchanger portions may be operatively connected such that the second fluid may flow therebetween through a conduit extending from and along the second manifold of the one of the second heat exchanger portions to and along the first manifold of the other of the second heat exchanger portions.

The first heat exchanger portions typically include fluid-carrying tubes, with the fluid-carrying tubes of each of the first heat exchanger portions extending in the same direction as the fluid-carrying tubes of each of the second heat exchanger portions.

Preferably, the dimension between the first and second ends of the second heat exchanger portions is less than the dimension from one side of the second heat exchanger portions to the other side of the second heat exchanger portions, such that the fluid-carrying tubes extend across the shorter dimension of the faces of the second heat exchanger portions. Additionally, the sides of the first heat exchanger portions are aligned with the sides of the second heat exchanger portions, the first end of the one of the first heat exchanger portions is adjacent the first end of the one of the second heat exchanger portions, and the second end of the other of the first heat exchanger portions is adjacent the second end of the other of the second heat exchanger portions.

The second end of the one of the first heat exchanger portions may be adjacent the first end of the other of the first heat exchanger portions, and the second end of the one of the second heat exchanger portions may be adjacent the first end of the other of the second heat exchanger portions.

The manifolds of the first and second heat exchanger portions may extend horizontally, such that the first and second heat exchanger portions are vertically separated, or the manifolds of the first and second heat exchanger portions may extend vertically, such that the first and second heat exchanger portions are horizontally separated.

In alternate embodiments, at least one of the sides or ends of one of the first heat exchanger portions extends outward of a side or end of one of the second heat exchanger portions. The first end of the one of the first heat exchanger portions may extend outward of the first end of the one of the second heat exchanger portions, and the second end of the other of the first heat exchanger portions extends outward of the second end of the other of the second heat exchanger portions. Also, at least one of the sides or ends of one of the second heat exchanger portions extends outward of a side or end of the one of the first heat exchanger portions.

In another aspect, the present invention is directed to a method for cooling fluids used in an engine of a motor vehicle comprising providing a heat exchanger assembly as described above. The method then includes flowing the first fluid through the first heat exchanger portions, and flowing the second fluid through the substantially directly extending tubes of the second heat exchanger portions and between the second manifold of the one of the second heat exchanger portions and the first manifold of the other of the second heat exchanger portions. The method also includes flowing cooling air through the heat exchanger assembly such that ambient cooling air flows in series through the one of the first heat exchanger portions and the one of the second heat exchanger portions, and ambient cooling air flows in series through the other of the second heat exchanger portions and the other of the first heat exchanger portions.

In practicing the method, preferably the second fluid flows in sequence through the second manifold of the other of the second heat exchanger portions, the substantially directly extending tubes of the other of the second heat exchanger portions, the first manifold of the other of the second heat exchanger portions, the second manifold of the one of the second heat exchanger portions, the substantially directly extending tubes of the one of the second heat exchanger portions, and the first manifold of the one of the second heat exchanger portions.

The second fluid may alternatively flow in sequence through the first manifold of the one of the second heat exchanger portions, the substantially directly extending tubes of the one of the second heat exchanger portions, the second manifold of the one of the second heat exchanger portions, the first manifold of the other of the second heat exchanger portions, the substantially directly extending tubes of the other of the second heat exchanger portions, and the second manifold of the other of the second heat exchanger portions.

Preferably, the first heat exchanger is a radiator and the first fluid is engine coolant, and wherein the second heat exchanger is a charge air cooler and the second fluid is charge air, each of the radiator and the charge air cooler portions being cooled by ambient air.

In its more preferred embodiment, the present invention is directed to a combined radiator and charge air cooler package including a radiator having upper and lower portions for cooling engine coolant. Each radiator portion has opposite front and rear faces through which ambient cooling air flows, opposite upper and lower ends adjacent the faces, and sides adjacent the faces between the upper and lower ends. The more preferred package also includes a charge air cooler having upper and lower portions for cooling charge air. Each charge air cooler portion has opposite front and rear faces through which cooling air flows, opposite upper and lower ends adjacent the faces, and sides adjacent the faces between the upper and lower ends, and includes manifolds at the upper and lower ends and charge air-carrying tubes extending substantially directly therebetween.

The upper charge air cooler portion is disposed in overlapping relationship and adjacent to the upper radiator portion, with the upper and lower ends of the upper charge air cooler portion being oriented in the same direction as the upper and lower ends of the upper radiator portion. One face of the upper radiator portion is disposed adjacent one face of the upper charge air cooler portion, such that the ambient cooling air may flow in series through the upper radiator portion and the upper charge air cooler portion. The lower charge air cooler portion is disposed in overlapping relationship and adjacent to the lower radiator portion, with the upper and lower ends of the lower charge air cooler portion being oriented in the same direction as the upper and lower ends of the lower radiator portion. The other face of the lower radiator portion is disposed adjacent one face of the lower charge air cooler portion, such that the ambient cooling air may flow in series through the lower charge air cooler portion and the lower radiator portion.

The radiator portions are operatively connected such that the engine coolant may flow between the lower manifold of the upper radiator portion and the upper manifold of the lower radiator portion. The charge air cooler portions are operatively connected such that the charge air may flow between the lower manifold of the upper charge air cooler portion and the upper manifold of the lower charge air cooler portion.

In a further aspect, the present invention is directed to a heat exchanger apparatus comprising a first heat exchanger having two portions for cooling a first fluid. Each first heat exchanger portion has opposite front and rear faces through which ambient cooling air flows, a pair of manifolds, and fluid-carrying tubes extending substantially directly therebetween. One of the first heat exchanger portions is disposed in a first plane, and the other of the first heat exchanger portions is disposed in a second plane, with the first and second planes being substantially parallel. The heat exchanger apparatus also includes a second heat exchanger having two portions for cooling a second fluid. Each second heat exchanger portion has opposite front and rear faces through which air flows, a pair of manifolds, and fluid-carrying tubes extending substantially directly therebetween.

One of the second heat exchanger portions is disposed in the second plane in overlapping relationship and adjacent to the one of the first heat exchanger portions, wherein one face of the one of the first heat exchanger portions is disposed adjacent one face of the one of the second heat exchanger portions. As a result, the ambient cooling air may flow in series through the one of the first heat exchanger portions and the one of the second heat exchanger portions. The other of the second heat exchanger portions is disposed in the first plane in overlapping relationship and adjacent to the other of the first heat exchanger portions, wherein the other face of the other of the first heat exchanger portions is disposed adjacent one face of the other of the second heat exchanger portions. As a result, the ambient cooling air may flow in series through the other of the second heat exchanger portions and the other of the first heat exchanger portions.

The first heat exchanger portions are operatively connected such that the first fluid may flow between a manifold of the one of the first heat exchanger portions and a manifold of the other of the first heat exchanger portions. The second heat exchanger portions are operatively connected such that the second fluid may flow between a manifold of the one of the second heat exchanger portions and a manifold of the other of the second heat exchanger portions.

The second heat exchanger portions may be operatively connected such that the second fluid may flow therebetween through a conduit extending from and along the manifold of the one of the second heat exchanger portions to and along the manifold of the other of the second heat exchanger portions. The conduit may contain at least one stiffening member.

The first heat exchanger portions may be operatively connected such that the first fluid may flow between a manifold of the one of the first heat exchanger portions and a manifold of the other of the first heat exchanger portions adjacent at least one side of the first heat exchanger portions, or around at least one side of the second heat exchanger portions.

A further related aspect of the invention provides a method for cooling fluids used in an engine of a motor vehicle, comprising providing a heat exchanger assembly as described above, flowing the first fluid sequentially through the one and the other of the first heat exchanger portions, and flowing the second fluid sequentially through the one and the other of the second heat exchanger portions. The method also includes flowing cooling air through the heat exchanger assembly such that ambient cooling air flows in series through the one of the first heat exchanger portions and the one of the second heat exchanger portions, and ambient cooling air flows in series through the other of the second heat exchanger portions and the other of the first heat exchanger portions.

BRIEF DESCRIPTION OF DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 6 is a perspective view of the radiator/charge air cooler package of FIG. 2.

FIG. 7 is a perspective view of an alternate heat exchanger package.

DETAILED DESCRIPTION

Figure 1:
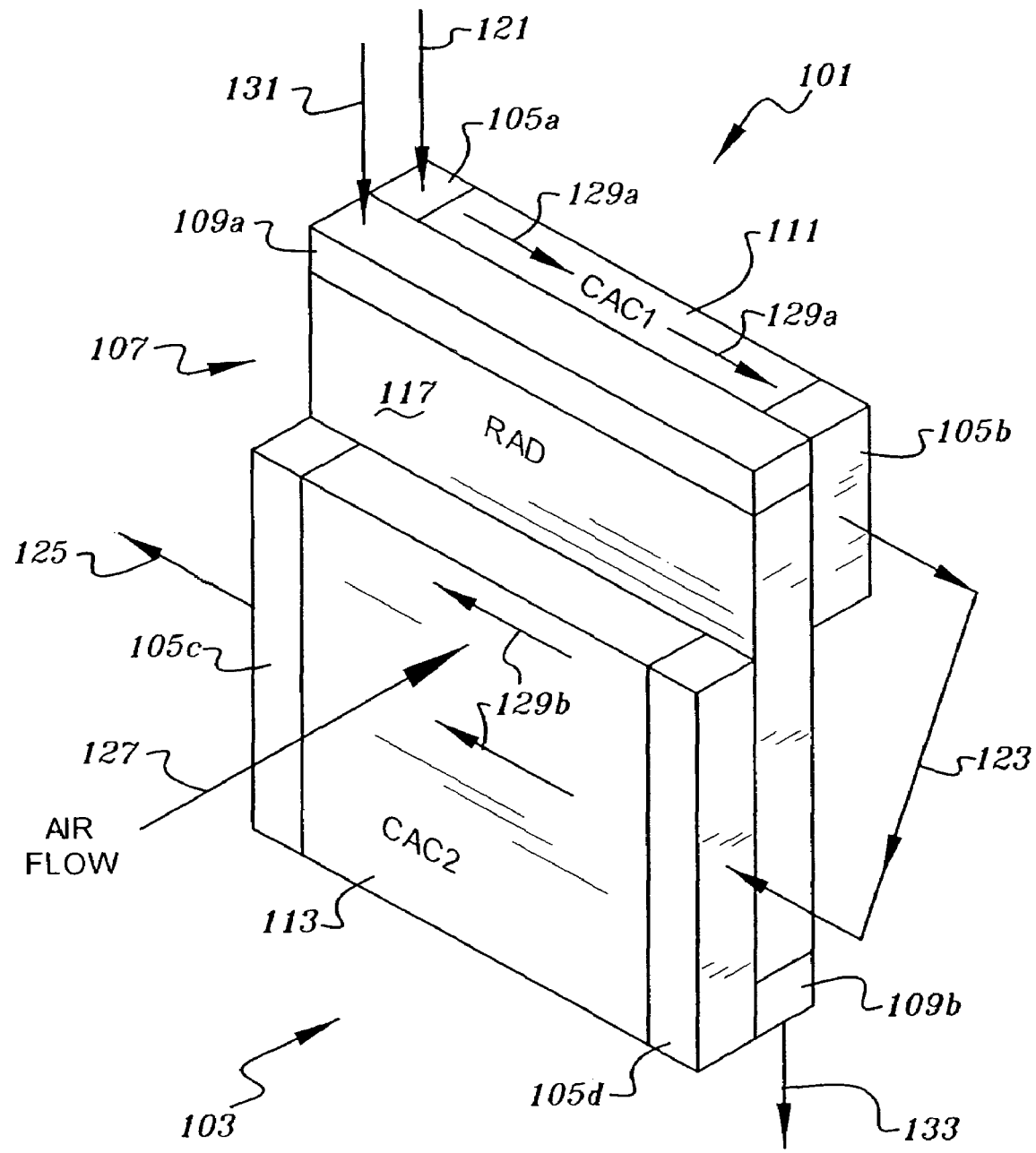
FIG. 1 is a perspective view of a prior art radiator/charge air cooler heat exchanger package.

In describing the preferred embodiment of the present invention, reference will be made herein to FIGS. 2–18 of the drawings in which like numerals refer to like features of the invention.

A first embodiment of the heat exchanger package of the present invention is depicted in FIGS. 2–6. A combined, integrated heat exchanger package 20 preferably comprises a first heat exchanger having at least two vertically split and separated units or portions 21, 22 for cooling a first fluid, preferably a radiator for use in cooling liquid engine coolant from a motor vehicle or other internal combustion engine, and another heat exchanger having at least two split units or portions 30, 32 for cooling a second fluid, preferably charge air coolers for cooling compressed charge air from a turbo or supercharger of an internal combustion engine. Although engine coolant will be used to exemplify the first fluid, and compressed charge air will be used to exemplify the second fluid, any other fluids may be substituted. Both heat exchangers are normally in an upstanding, essentially vertical position, and are preferably rectangular in shape, and the width and length of the combined heat exchanger package is consistent with the requirements of the truck or bus engine compartments. Radiator units 21, 22 of the present invention are preferably a down flow type radiator, wherein engine coolant 40 enters the first radiator unit 21 through an upper manifold or tank 24a extending substantially the entire width of the radiator. The coolant is then distributed from manifold 24a into attached core 26a having an otherwise conventional construction, which generally comprises downwardly extending tubes 23 connected by cooling fins 29 (FIG. 5), so that ambient cooling air 46 may flow from the front face 28a of the core through and out of the rear face 28b. After being cooled by the ambient air, the coolant then collects in attached lower manifold or tank 24b also extending across the width of the radiator. From manifold 24b, the coolant is then transferred to separate radiator unit 22 (which is constructed in the same manner as unit 21) into upper manifold 24c, through core 26b, into lower manifold 24d and out through the coolant outlet for return 48 to the engine. As will be explained below, ambient cooling air first passes through one of the charge air cooler units before flowing through radiator unit 22 front face 28c, radiator core 26b, and rear face 28d.

Figure 2:
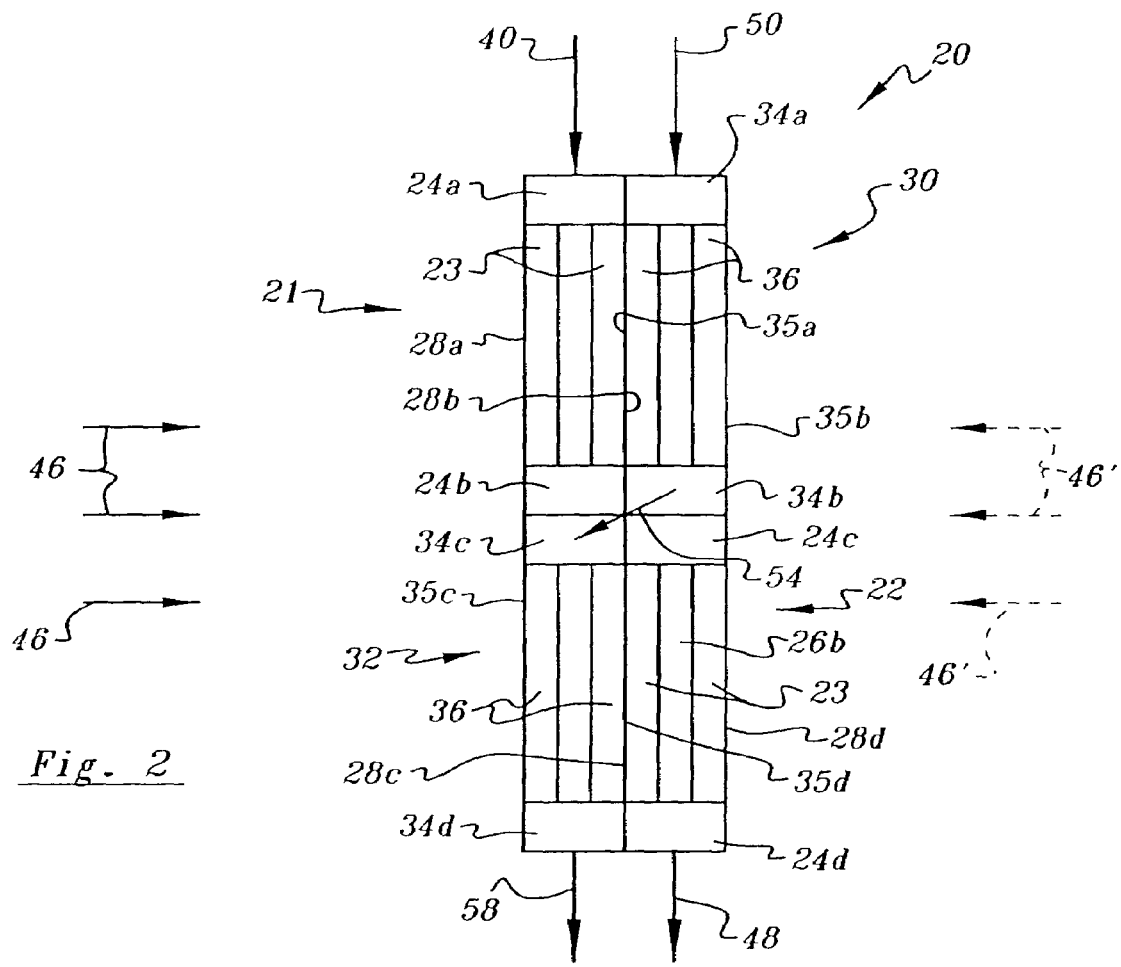
FIG. 2 is a side elevational view of one embodiment of the radiator/charge air cooler heat exchanger package of the present invention.
Figure 4:
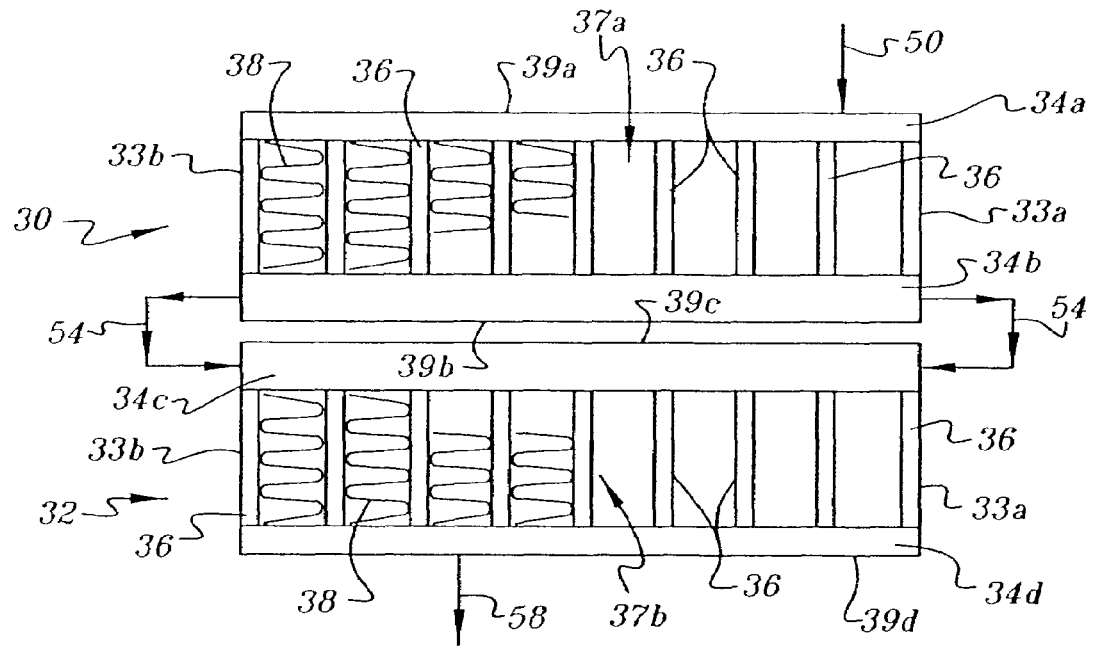
FIG. 4 is a front elevational view of the split charge air cooler portions of the heat exchanger package of FIG. 2, without the radiator portions, and showing cooling fins over only a portion of the tubes of the core.

The charge air cooler (CAC) of the present invention preferably comprises a pair of vertically split and separated units or portions 30, 32 (FIGS. 2 and 4). Upper CAC unit 30 is disposed in an overlapping fashion with radiator upper unit 21, so that the upper edge 39a and sides 33a, 33b of CAC unit 30 are essentially coincident with and behind the upper edge 25a and sides 27a, 27b of radiator unit 21, with respect to the direction of cooling air 46. Front face 35a of CAC unit 30 is abutted to or slightly spaced from rear face 28b of radiator unit 21. CAC unit 30 contains an upper tank or manifold 34a and a lower tank or manifold 34b and a core 37a attached therebetween, each extending substantially the full width of the charge air cooler unit. Lower CAC unit 32 is positioned in front of radiator lower unit 22, with respect to air flow direction 46, and the lower end 39d and sides 33a, 33b of unit 32 are essentially coincident with the lower end 25d and lower sides 27a, 27b of radiator unit 22. Rear face 35d of CAC unit 32 is abutted to or slightly spaced from front face 28c of radiator unit 22. CAC unit 32 contains an upper tank or manifold 34c and a lower tank or manifold 34d and a core 37b attached therebetween, each extending substantially the full width of the charge air cooler unit. Both CAC cores 37a, 37b are conventional tube and fin construction. Lower manifold 34b of CAC unit 30 is operatively connected to upper manifold 34c of CAC unit 32, so that charge air may flow therebetween.

The charge air cooler units of FIGS. 2–6 are preferably either up or down flow units, and not cross flow units. Thus, as shown in FIG. 6, the entering heated compressed charge air 50 flows through manifold 34a and downward 52 to be cooled in core 37a, made up of otherwise conventional charge air cooler tubes and cooling fins, and collected into a lower manifold 34b. This compressed charge air 54 is then transferred to the upper manifold 34c of lower CAC unit 32, where the now partially cooled charge air 56 then flows downward through core 37b, into lower manifold 34d, and out as cooled compressed air 58 to be routed to the engine air intake manifold.

As shown in more detail in FIG. 4, each of the cores 37a, 37b for the CAC units 30, 32 comprise spaced, vertically extending tubes 36, between which are disposed serpentine cooling fins 38, oriented to permit cooling air flow through the unit. Such fins should extend between all of the tubes in the core. These tubes may be two (2) rows deep, as shown in FIG. 2, or any other configuration. Both charge air cooler units 30 and 32 have a horizontal width, measured in the direction of the manifolds, which is greater than the vertical height of each of the units, measured between the manifolds. Improved heat exchanger package performance, and in particular, improved performance of the charge air cooler units as a result of reduced charge air pressure drop, has been obtained by utilizing tubes 36 which are as short as possible and as numerous as possible, given the configuration of the charge air cooler unit. As shown in this embodiment, charge air cooler units 30 and 32 employ tubes 36 which are oriented with the shorter vertical height of each of the units so that there are a larger number of shorter tubes, as contrasted to the smaller number of longer tubes as used in the cross flow CAC unit of FIG. 1.

Figure 5:
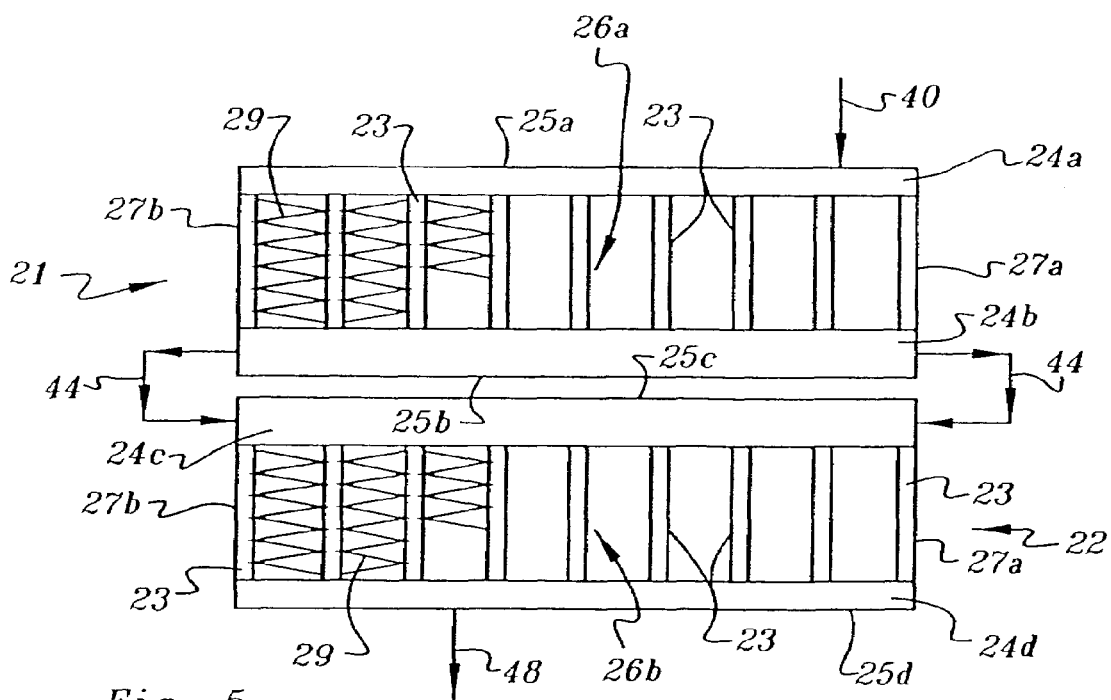
FIG. 5 is a front elevational view of the split radiator portions of the heat exchanger package of FIG. 2, without the charge air cooler portions, and showing cooling fins over only a portion of the tubes of the core.

Cores 26a, 26b for radiator units 21, 22 are shown in FIG. 5 as down flow units having cooling fins 29 extending between spaced, vertically extending tubes 33 to permit cooling air flow through the unit. Such fins should extend between all of the tubes in the core. These tubes 23 may be two (2) rows deep, as shown in FIG. 2, or any other configuration. Like the CAC units, the radiator units 21, 22 are depicted as down flow units, with the tubes extending in the direction of the shorter dimension of the unit, the height, so that a large number of tubes are employed. Alternatively, when the pressure drop of the coolant in the radiator is not critical, the radiator units can be cross-flow units, where the tubes extend in the direction of the length of the longer, width dimension of the unit, with a fewer number of tubes being employed.

Heat exchanger cores 26a, 26b, 37a, 37b can be constructed of typical materials, for example aluminum, brass or copper tubes and fins. Manifolds 24a, 24b, 24c, 24d, 34a, 34b, 34c, 34d may be any conventional materials such as plastic, aluminum, brass or copper.

FIG. 7 depicts another embodiment 20' of the present invention which is structurally identical to the previous embodiment, with the difference being that the radiator and charge air cooling units are rotated 90°, so that the radiator and CAC units are horizontally separated. As before, manifolds 24a, 24b, 24c, 24d of radiator units 21 and 22 may be oriented in the same direction as manifolds 34a, 34b, 34c, 34d of CAC units 30 and 32. In this embodiment, all of the manifolds of the radiator and charge air cooler units are vertically oriented and horizontally spaced and, consequently, the fluid flow through the now horizontal tubes within the cores of the respective radiator and charge air cooler units is now horizontal. However, the performance of the heat exchanger package in the embodiment of FIG. 7 is the substantially the same as that in the embodiment of FIGS. 2–6 since the charge air cooler tubes are as short and as numerous as possible given that the horizontal width of each charge air cooler unit is less than its vertical height.

Figure 8:
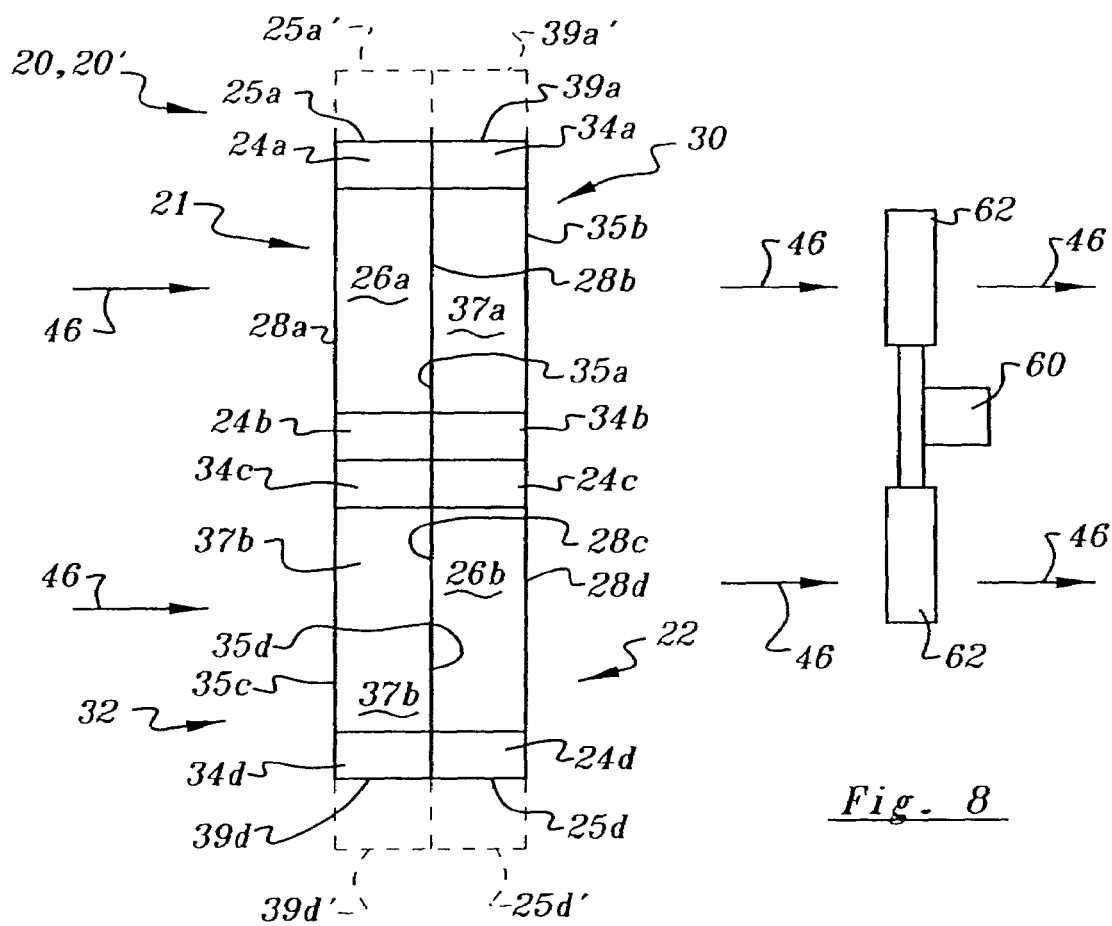
FIG. 8 is a plan or side elevational view of the radiator/charge air cooler heat exchanger package of the present invention in relation to a cooling fan.

FIG. 8 depicts the heat exchanger package 20, 20' of the previous embodiments in relation to a cooling suction fan having fan blades 62 powered by a fan motor 60. The heat exchanger package 20, 20' is in line with the area swept by the fan blades to move the outside ambient cooling air 46 through each of the CAC units 30, 32 and radiator units 21, 22. Preferably, radiator manifolds 24b, 24c and CAC manifolds 34b, 34c are positioned in line with the center of the fan blades 62 and fan motor 60, where airflow is low or nearly zero. A fan shroud (not shown) may be positioned circumferentially around the fan blades and the heat exchanger package top and side edges to contain and direct the airflow. The heat exchanger package is configured so that one radiator unit, 21, is aligned with one CAC unit, 32, in the same plane normal to the direction of cooling air flow 46, so that the cooling air flows in parallel through these radiator and CAC units. The other radiator unit, 22, is aligned with the other CAC unit, 30, also in the same plane normal to the direction of cooling air flow 46, so that the cooling air flows in parallel through these radiator and CAC units. Radiator/CAC units 22, 32 are in an abutted or closely spaced relationship with and connected in series to the radiator/CAC units 21, 30 and are aligned so that ambient cooling air 46 passes through both radiator and CAC units 21 and 30, and radiator and CAC units 32 and 22, in a serial or sequential manner. The front and back faces of radiator/CAC units 21 and 32 and the front and back faces of radiator/CAC units 22 and 30 are also preferably in the same respective planes, as shown in FIG. 8.

In operation, ambient cooling air 46 presented to approximately half of the heat exchanger package 20 or 20' flows sequentially and in series through the free front face 28a of radiator unit 21, through core 26a, out through the rear face 28b and, now having been heated to above ambient temperature, then immediately flows through adjacent front face 35a of CAC unit 30. After passing through CAC core 37a, the cooling air passes out through rear face 35b. In the other approximately half of heat exchanger package 20 or 20', parallel ambient air 46 flows sequentially and in series through front face 35c of core 37b of CAC unit 32, and out of CAC rear face 35d and, now having been heated to above ambient temperature, then immediately through adjacent face 28c of radiator unit 22. After passing through the radiator core 26b, the ambient cooling air then exits through free rear face 28d of radiator unit 22. Notwithstanding the fact that it is heated as it passes through the fins of the radiator and CAC units, unless otherwise specified, the term ambient air includes all of the cooling air as it passes through the heat exchanger package.

As shown in FIG. 6, the operational flow of fluid to be cooled is such that the initially hot engine coolant 40 is received in manifold 24a of radiator unit 22 and cooled as it passes 42 through radiator core 26a, given that ambient air 46 is at a lower temperature than the incoming engine coolant 40. The partially cooled engine coolant is then transferred 44 from manifold 24b to manifold 24c of radiator unit 32, where it passes 45 through radiator core 26b and manifold 24d, and out 48 to return to the engine at a cooler temperature. Incoming compressed charge air 50 is normally at a higher temperature than the incoming engine coolant, and is initially passed through upper charge air cooler unit 30. This heated charge air flows through core 37a and is then cooled by air 46, after that air passes through and is heated by radiator upper core 26a of radiator unit 21. The partially cooled compressed charge air 54 then passes from lower manifold 34b to upper manifold 34c of lower CAC unit 32. CAC unit 32 is in front of radiator lower unit 22 with respect to the cooling air flow, and as the charge air 56 passes downward through core 37b, it is cooled by the fresh ambient air before it passes out through manifold 34d of CAC unit 32 as cooled compressed air 58, which is then routed to the air intake manifold of the engine.

The flow of ambient cooling air may be reversed for the embodiments described herein, so that it flows in direction 46' (FIGS. 6 and 7). To accomplish this, a blower fan may be used in place of the suction fan to blow air first through the fan and then through the heat exchanger package. Additionally, the flow of fluids to be cooled may be reversed from that described above. The cooling performance of the heat exchanger package, including the CAC units, will be the same when reversing the flow of the ambient cooling air, so that it flows in direction 46', and reversing the flow of the charge air, so that the charge air enters through manifold 34d and exits through manifold 34a.

Figure 3:
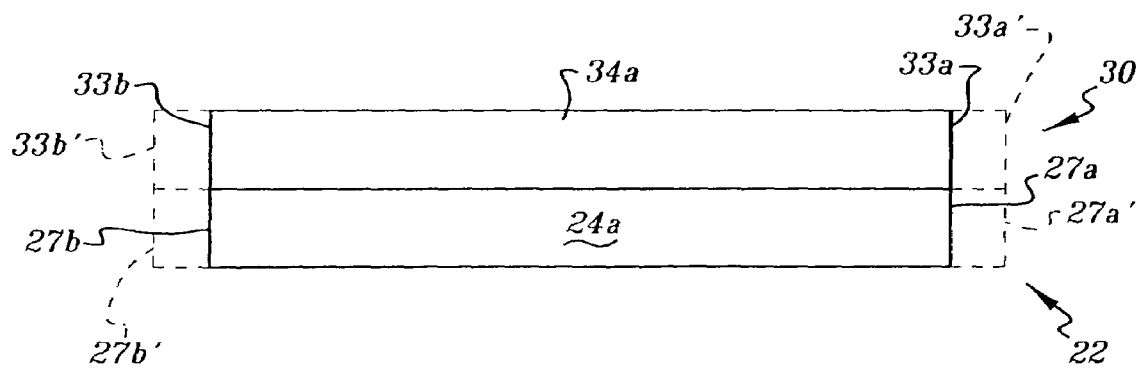
FIG. 3 is a top plan view of the radiator of the radiator/charge air cooler package of FIG. 2.

The sides and upper and lower ends of the CAC and radiator units are preferably aligned, so that there are no non-overlapping regions between the top, bottom or sides of the radiator and the corresponding top, bottom and sides of the CAC units. However, in alternate embodiments, the heat exchanger package of the present invention may include such non-overlapping regions. For example, as shown in FIG. 8, radiator ends 25a' or 25d' adjacent manifolds 24a, 24d, respectively, may extend above and below the corresponding charge air cooler unit ends 39a, 39d, adjacent manifolds 34a, 34d, respectively. Alternatively, ends 39a', 39d' of the charge air cooler units may extend above and below the upper and lower ends 25a, 25d of the radiator units. As shown in FIG. 3, it is also possible for there to be non-overlapping regions along the sides of the heat exchanger package. One or both of sides 27a', 27b' of the radiator units may extend beyond the sides of the heat exchanger units 33a, 33b. Alternatively, any of the charge air cooler sides 33a', 33b' may extend beyond the sides 27a, 27b of the radiator units. If any such non-overlapping regions are used, the portions of either of the charge air cooler units or radiator extending beyond and behind the other will then receive fresh ambient air. Additional heat exchangers typically employed in motor vehicles may be used in the heat exchanger package of the present invention, such as engine oil and transmission oil coolers, and air conditioning condenser units may also be used, either in front of or behind upper or lower portions of the package.

Figure 9:
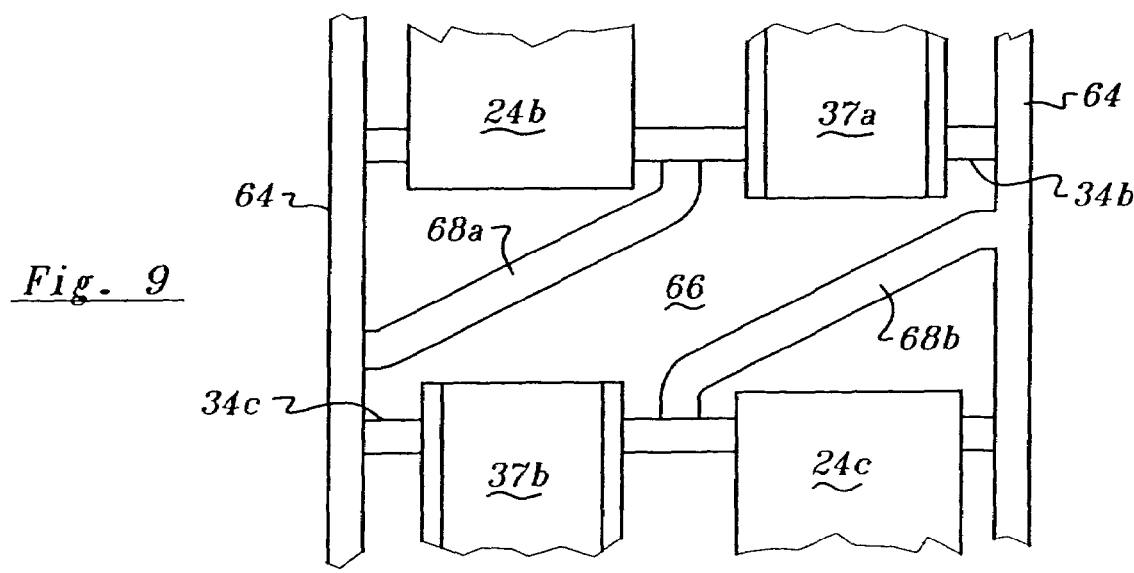
FIG. 9 is a side cross-sectional view of a portion of the heat exchanger package of the present invention showing one embodiment of the connecting manifold between the two charge air cooler units.
Figure 10:
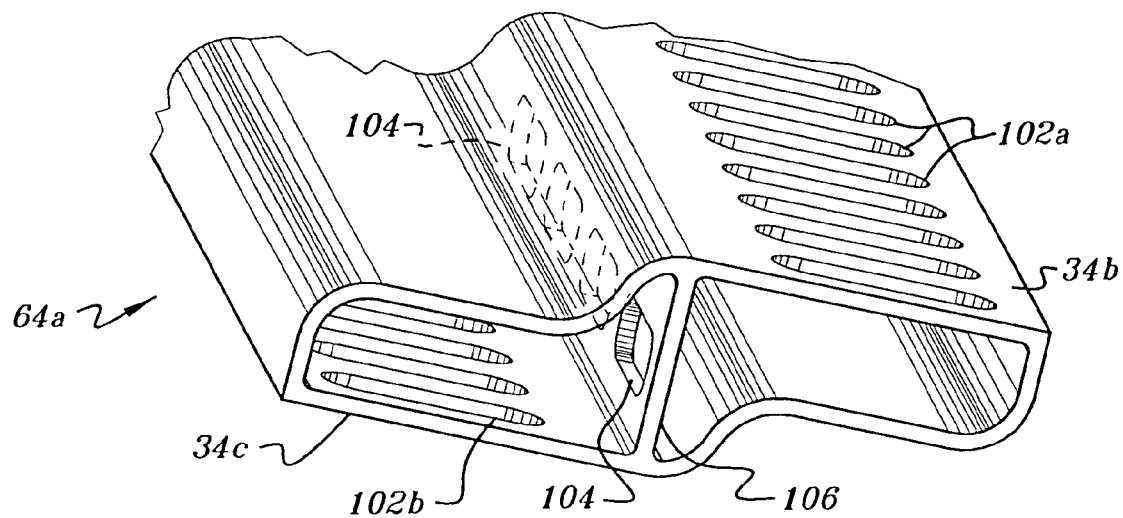
FIG. 10 depicts a cross-section of a perspective view of another embodiment of the connecting manifold between the two charge air cooler units, which is cast in a single unit.
Figure 11:
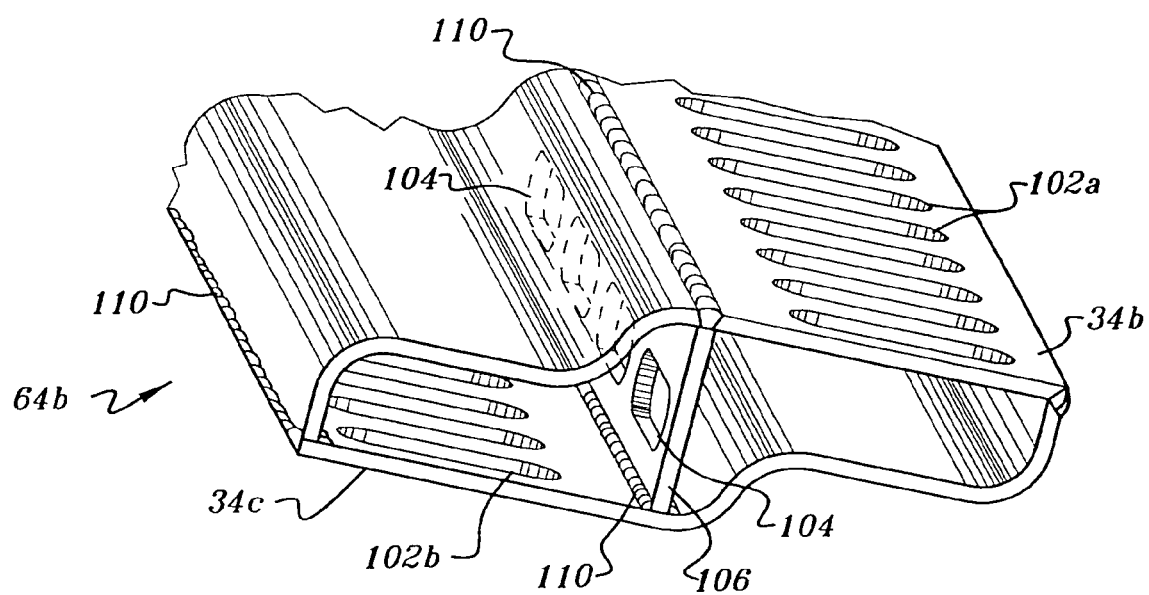
FIG. 11 depicts a cross-section of a perspective view of the same connecting manifold as shown in FIG. 11, except that it is welded of several sections.

One embodiment of the manifold connection between the charge air cooler units is depicted in FIG. 9. Core 37a of CAC unit 30 has on it a lower end manifold 34b, and CAC unit 32 has on its upper end manifold 34c, both contained within transition conduit 64. As depicted, an air passageway or conduit 66 formed by duct walls 68a, 68b extends between manifolds 34b and 34c, along substantially their full lengths, and directly and operatively connects the CAC units 30, 32 substantially along their full widths and in their different planes to permit airflow therebetween. Other preferred embodiments of the connecting manifolds are depicted in cross-section in FIGS. 10 and 11, wherein the transition conduit 64a is as-cast as a single, integral unit 64a (FIG. 10) or is a welded unit 64b made up of four formed sections joined by welds 110 (FIG. 11). In both embodiments, tube openings 102a, 102b receive CAC tubes in polymeric grommets from cores 37a, 37b, respectively, to create the tube-to-header joints. (As shown, these CAC tubes are one-deep through the thickness of the core, as opposed to the two deep tube arrangement of FIG. 2, for example.) A central, vertical stiffening rib 106 extends from top to bottom within the manifold conduit, along substantially the full width of the CACs, to resist bursting as a result of the internal charge air pressure (generally about 50–55 psig), and contains multiple openings 104 for charge air passage therethrough. Multiple stiffening ribs, with spaces or openings between for charge air flow, may also be used across the width of the CAC manifolds. Alternatively, there may be employed one or more internal transverse stiffening ribs at right angles to the longer dimension of the manifolds.

Figure 12:
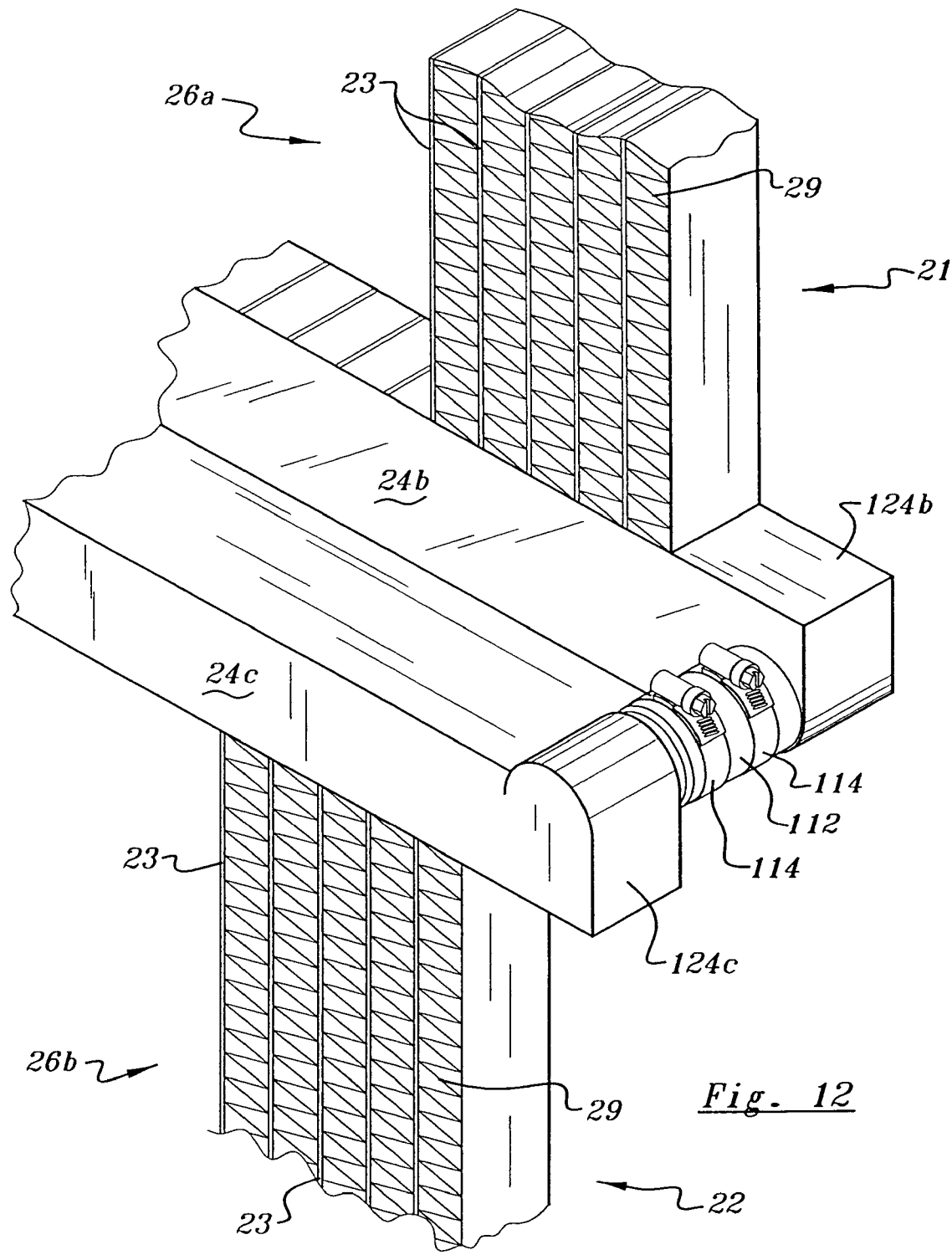
FIG. 12 is perspective view of a portion of the heat exchanger packages of the present invention showing one embodiment of a connection between the two radiator units, with the CAC units removed.

In FIG. 12 there is shown an embodiment of the operative coolant connection between radiator units 21, 22, with the CAC units removed. Manifolds 24b, 24c each have extensions 124b, 124c, respectively, that extend outward from a side of the radiator units, and utilize clamps 114 and/or hose 112 to provide for coolant flow between the two. Preferably, a similar extension and connection is provided around the opposite side of the radiator units. This radiator unit coolant connection may then be used in conjunction with the CAC unit charge air connection of FIGS. 9, 10 and 11, which connect along the center of the CAC units.

Figure 13:
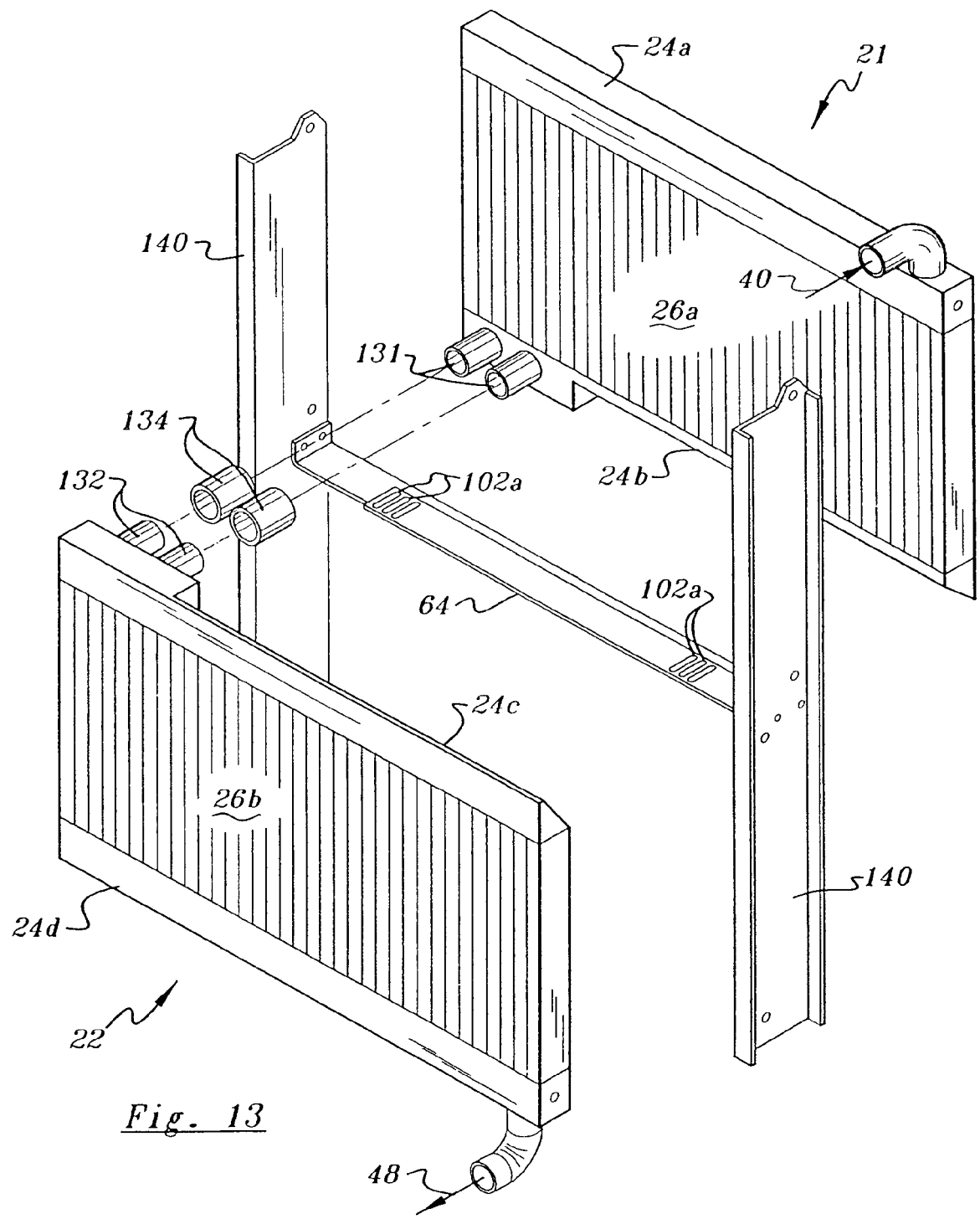
FIG. 13 is a perspective view of fluid connections between the radiator units and CAC units, with the CAC units removed, wherein the connections are contained within the overall width of the radiator and CAC units in the heat exchanger package.

FIG. 13 shows another embodiment of a coolant connection between radiator units 21, 22, in conjunction with CAC manifold transition conduit 64, both mounted to frame 140. Pairs of coolant inlets/outlets 131 and 132, on radiator manifolds 24b, 24c, respectively, connect on opposite ends to transition coolant connectors 134, to transfer coolant between the radiator units. In this embodiment, the coolant connection is disposed adjacent a side, but within the width, of radiator units 21, 22, so as not to widen the overall width of the heat exchanger package, and the width of conduit 64 between the CAC manifolds is shortened accordingly.

Figure 14:
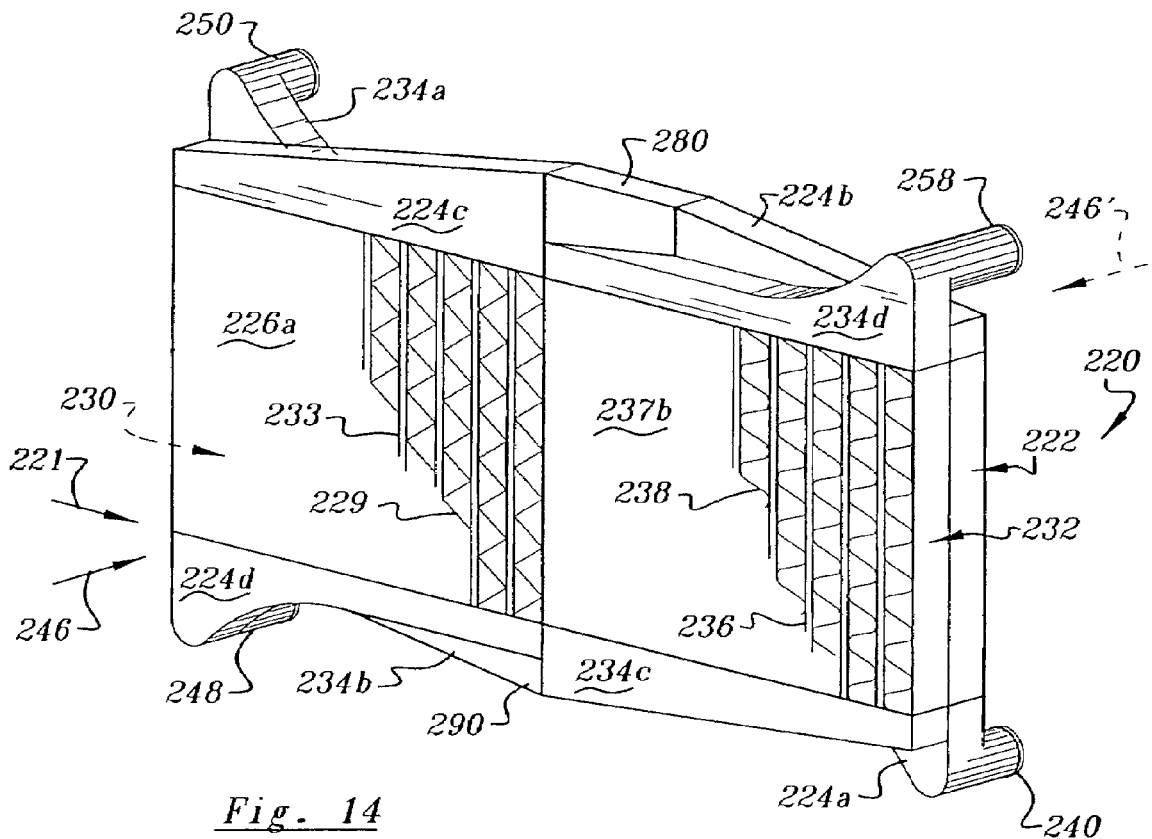
FIG. 14 is a perspective view of an alternate embodiment of the two-core-deep heat exchanger package of the present invention, in which both the radiator and CAC units are up- or downflow units, arranged side-by-side.
Figure 15:
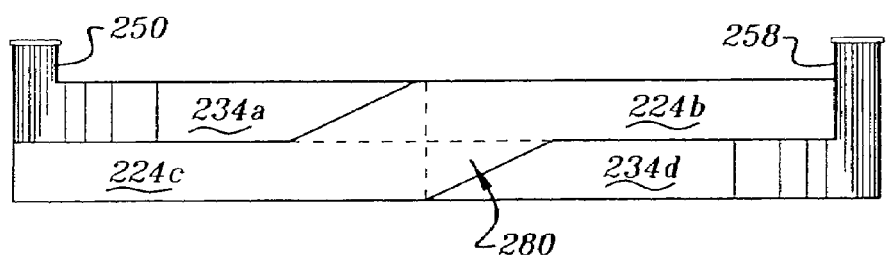
FIG. 15 is a top plan view of the alternate heat exchanger package of FIG. 14, showing the crossover manifold configuration of the charge air cooler units.
Figure 16:
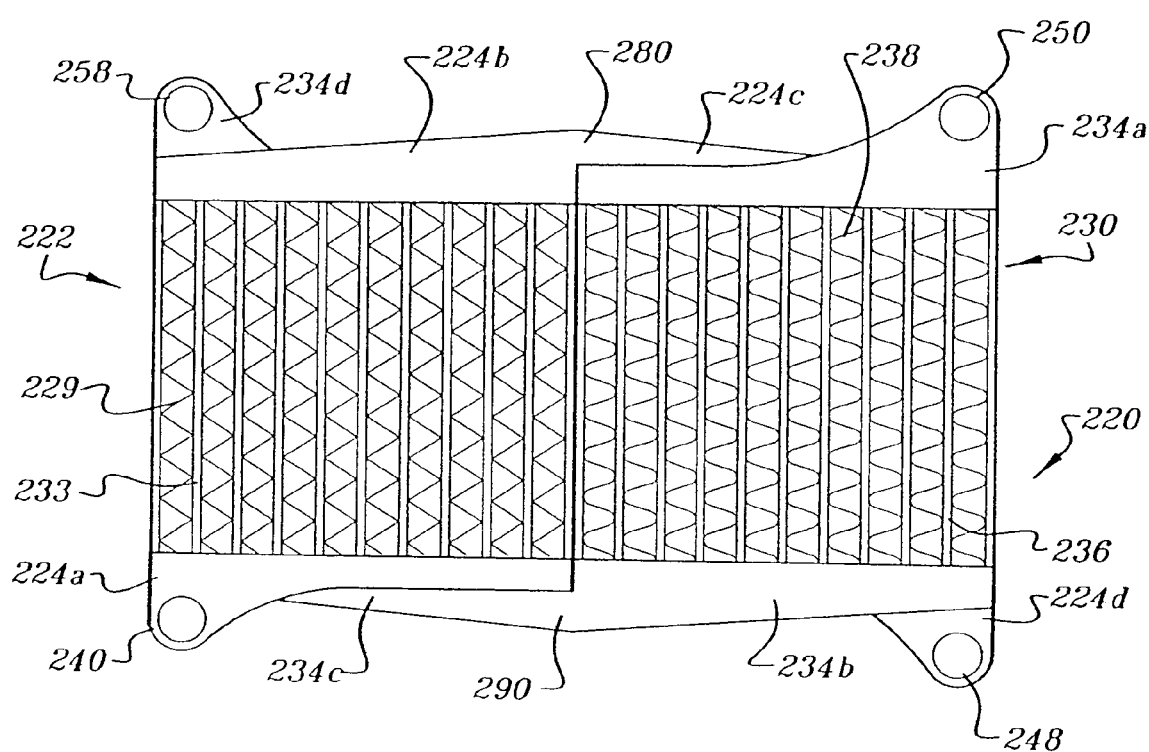
FIG. 16 is a elevational view of the back side of the alternate heat exchanger package of FIG. 14.

Another embodiment of the present invention is shown in FIGS. 14, 15 and 16. This heat exchanger package 220 also has the two-core-deep configuration of the split radiator and CAC units as shown in the previous embodiments. As before, radiator unit 221 and CAC unit 232 are disposed side-by-side in one plane, and CAC unit 230 and radiator unit 222 are side-by-side in another plane. As depicted, cooling ambient air flow 246 is first through fins 229 of core 226a in radiator unit 221 and fins 238 of core 237b in CAC unit 232, and then sequentially through the respective fins and cores of CAC unit 230 and radiator unit 222. (As before, the cooling ambient air flow may be reversed, as shown by direction 246'.) Like the previous embodiments, this embodiment utilizes up- or downflow cores, wherein the CAC tubes 236 and radiator tubes 233 extending between their respective manifolds are shorter than the width dimension of the manifolds. Where charge air pressure drop may not be of great a concern, the CAC and radiator tubes may be made longer than the width dimension of the manifolds. As with the previous embodiments, heat exchange package 220 may be rotated 90° so that the CAC and radiator unit cores are side-flow.

This embodiment of FIGS. 14–16 also provides a compact heat exchanger package. Charge air flow is initially into inlet 250, through manifold 234a, tubes 236, manifold 234b, manifold 234c, tubes 236, manifold 234d, and out of outlet 258. Engine coolant flow is initially into inlet 240, through manifold 224a, tubes 233, manifold 224b, manifold 224c, tubes 233, manifold 224d, and out of outlet 248. As shown in FIG. 15, a crossover section 280, passing over CAC unit manifolds 234a, 234d, connects radiator manifolds 224b, 224c, to permit coolant flow therebetween. A similar crossover section 290 at the lower end of the heat exchanger package connects CAC manifolds 234b, 234c to permit charge air flow therebetween.

Figure 17:
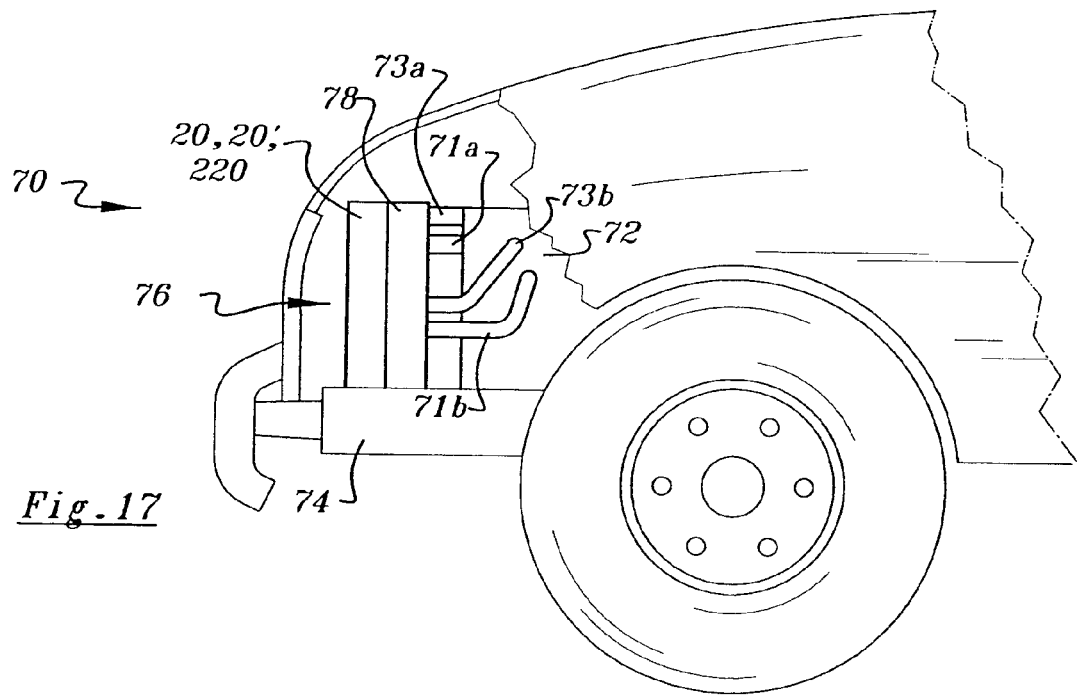
FIG. 17 is a side elevational view, partially cut away, showing the combined radiator/charge air cooler heat exchanger combination of the present invention mounted under the hood of a highway truck.
Figure 18:
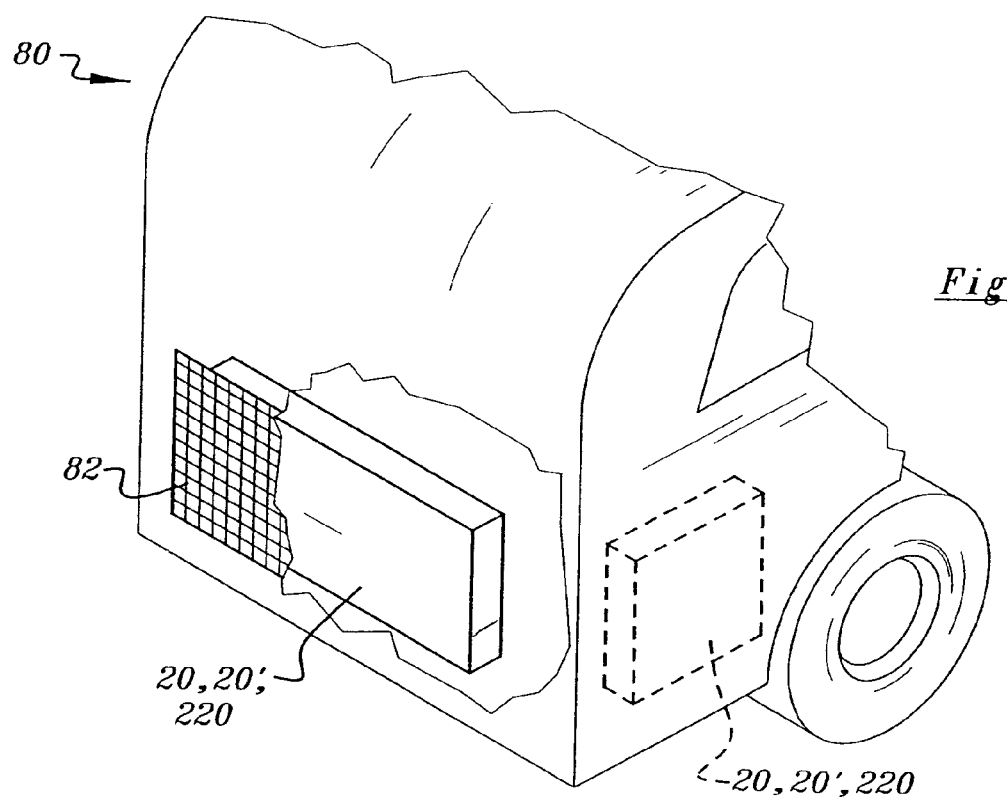
FIG. 18 shows alternate locations of the combination radiator/charge air cooler heat exchanger package of the present invention mounted in the rear of a highway bus.

Referring to FIG. 17, a heavy duty highway truck 70 is shown including engine 72 located in engine compartment 76 at the front portion of the truck. The vehicle includes a lower frame 74 having the combined radiator/CAC heat exchanger package 20, 20', 220 mounted vertically at the front end of engine compartment 76. The fan is mounted within fan shroud 78 positioned behind the heat exchanger package. The radiator units are operatively connected to the cooling system of engine 72 by inlet hose 71a and outlet hose 71b which provide for flow of the engine coolant from and to the engine. The charge air cooler units are operatively connected between the engine turbo or supercharger and the engine air intake manifold by inlet hose 73a and outlet hose FIG. 18 depicts the heat exchanger package of the invention 20, 20', 220 mounted at the rear of a bus behind grill 82, or at the side near the rear (in phantom lines).

Thus, the heat exchanger package of the present inventions provides a combination radiator and charge air cooler which achieves high heat transfer performance with a minimal frontal area, while minimizing pressure loss to the fluids. It is particularly useful to cooling fluids such as engine coolant and charge air used in the engine of a heavy-duty truck, highway bus or other motor vehicle. The fact that both the radiator and charge air cooler are split into two smaller units makes them lighter and easier to handle in manufacturing and in individual replacement.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A heat exchanger apparatus comprising:
   a first heat exchanger having two portions for cooling a first fluid, each first heat exchanger portion having opposite front and rear faces through which ambient cooling air flows, opposite first and second ends adjacent the faces of the first heat exchanger portion, and sides adjacent the faces of the first heat exchanger portion between the first and second ends of the first heat exchanger portion;

a second heat exchanger having two portions for cooling a second fluid, each second heat exchanger portion having opposite front and rear faces through which air flows, opposite first and second ends adjacent the faces of the second heat exchanger portion, and sides adjacent the faces of the second heat exchanger portion between the first and second ends of the second heat exchanger portion, and including manifolds at the first and second ends of the second heat exchanger portions and fluid-carrying tubes extending substantially directly between the manifolds at the first and second ends of the second heat exchanger portions, one of the second heat exchanger portions being disposed in overlapping relationship and adjacent to one of the first heat exchanger portions with the first and second ends of the one of the second heat exchanger portions being oriented in the same direction as the first and second ends of the one of the first heat exchanger portions, wherein one face of the one of the first heat exchanger portions is disposed adjacent one face of the one of the second heat exchanger portions, such that the ambient cooling air may flow in series through the one of the first heat exchanger portions and the one of the second heat exchanger portions, the other of the second heat exchanger portions being disposed in overlapping relationship and adjacent to the other of the first heat exchanger portions with the first and second ends of the other of the second heat exchanger portions being oriented in the same direction as the first and second ends of the other of the first heat exchanger portions, wherein the other face of the other of the first heat exchanger portions is disposed adjacent one face of the other of the second heat exchanger portions, such that the ambient cooling air may flow in series through the other of the second heat exchanger portions and the other of the first heat exchanger portions, the first heat exchanger portions being operatively connected such that the first fluid may flow between the second manifold of the one of the first heat exchanger portions and the first manifold of the other of the first heat exchanger portions, and the second heat exchanger portions being operatively connected such that the second fluid may flow between the second manifold of the one of the second heat exchanger portions and the first manifold of the other of the second heat exchanger portions.

2. The heat exchanger apparatus of claim 1 wherein the one of the first heat exchanger portions and the other of the second heat exchanger portions are disposed in substantially the same plane, and wherein the other of the first heat exchanger portions and the one of the second heat exchanger portions are disposed in substantially the same plane.

3. The heat exchanger apparatus of claim 1 wherein the first heat exchanger portions are operatively connected such that the first fluid may flow between the second manifold of the one of the first heat exchanger portions and the first manifold of the other of the first heat exchanger portions adjacent at least one side of the first heat exchanger portions.

4. The heat exchanger apparatus of claim 1 wherein the first heat exchanger portions are operatively connected such that the first fluid may flow between the second manifold of the one of the first heat exchanger portions and the first manifold of the other of the first heat exchanger portions around at least one side of the second heat exchanger portions.

5. The heat exchanger apparatus of claim 1 wherein the second heat exchanger portions are operatively connected such that the second fluid may flow therebetween through a conduit extending from and along the second manifold of the one of the second heat exchanger portions to and along the first manifold of the other of the second heat exchanger portions.

6. The heat exchanger apparatus of claim 1 wherein the dimension between the first and second ends of the second heat exchanger portions is less than the dimension from one side of the second heat exchanger portions to the other side of the second heat exchanger portions, such that the fluid-carrying tubes extend across the shorter dimension of the faces of the second heat exchanger portions.

7. The heat exchanger apparatus of claim 1 wherein the first heat exchanger portions include fluid-carrying tubes, the fluid-carrying tubes of each of the first heat exchanger portions extending in the same direction as the fluid-carrying tubes of each of the second heat exchanger portions.

8. The heat exchanger apparatus of claim 1 wherein the sides of the first heat exchanger portions are aligned with the sides of the second heat exchanger portions, and wherein the first end of the one of the first heat exchanger portions is adjacent the first end of the one of the second heat exchanger portions and the second end of the other of the first heat exchanger portions is adjacent the second end of the other of the second heat exchanger portions.

9. The heat exchanger apparatus of claim 1 wherein the second end of the one of the first heat exchanger portions is adjacent the first end of the other of the first heat exchanger portions, and wherein the second end of the one of the second heat exchanger portions is adjacent the first end of the other of the second heat exchanger portions.

10. The heat exchanger apparatus of claim 1 wherein manifolds of the first and second heat exchanger portions extend horizontally, and the first and second heat exchanger portions are vertically separated.

11. The heat exchanger apparatus of claim 1 wherein manifolds of the first and second heat exchanger portions extend vertically, and the first and second heat exchanger portions are horizontally separated.

12. The heat exchanger apparatus of claim 1 wherein at least one of the sides or ends of one of the first heat exchanger portions extends outward of a side or end of one of the second heat exchanger portions.

13. The heat exchanger apparatus of claim 1 wherein the first end of the one of the first heat exchanger portions extends outward of the first end of the one of the second heat exchanger portions.

14. The heat exchanger apparatus of claim 1 wherein the first end of the one of the first heat exchanger portions extends outward of the first end of the one of the second heat exchanger portions and the second end of the other of the first heat exchanger portions extends outward of the second end of the other of the second heat exchanger portions.

15. The heat exchanger apparatus of claim 1 wherein at least one of the sides or ends of one of the second heat exchanger portions extends outward of a side or end of the one of the first heat exchanger portions.

16. The heat exchanger apparatus of claim 1, wherein the first heat exchanger is a radiator for cooling engine coolant and the second heat exchanger is a charge air cooler for cooling charge air, and wherein:

the radiator has upper and lower portions, with each
  radiator portion having opposite upper and lower ends
  adjacent the faces of the radiator portion;
the charge air cooler has upper and lower portions, with
  each charge air cooler portion having opposite upper
  and lower ends adjacent the faces of the charge air
  cooler portion, and upper and lower manifolds extend-
  ing across the upper and lower ends, respectively, of
  each charge air cooler portion,
the upper charge air cooler portion being disposed in
  overlapping relationship and adjacent to the upper
  radiator portion with the upper and lower ends of the
  upper charge air cooler portion being oriented in the
  same direction as the upper and lower ends of the upper
  radiator portion, wherein the rear face of the upper
  radiator portion is disposed adjacent the front face of
  the upper charge air cooler portion and the upper
  manifold of the upper charge air cooler portion is
  disposed adjacent the upper end of the upper radiator
  portion,
the lower charge air cooler portion being disposed in
  overlapping relationship and adjacent to the lower
  radiator portion with the upper and lower ends of the
  lower charge air cooler portion being oriented in the
  same direction as the upper and lower ends of the lower
  radiator portion, wherein the front face of the lower
  radiator portion is disposed adjacent the rear face of the
  lower charge air cooler portion and the lower manifold
  of the lower charge air cooler portion is disposed
  adjacent the lower end of the lower radiator portion, the
  lower end of the upper charge air cooler portion being
  substantially in line with and opposite the upper end of
  the lower charge air cooler portion,
the charge air cooler portions being operatively connected
  by a conduit extending from the lower manifold at the
  lower end of the upper charge air cooler portion to the
  upper manifold at the upper end of the lower charge air
  cooler portion such that the charge air may flow
  through the conduit between the upper charge air cooler
  portion and the lower charge air cooler portion.

17. The heat exchanger apparatus of claim 16, wherein the upper radiator portion and the lower charge air cooler portion are disposed substantially in a first plane, and wherein the lower radiator portion and the upper charge air cooler portion are disposed substantially in a second plane, the first and second planes being substantially parallel.

18. A combined radiator and charge air cooler package comprising:
  a radiator having upper and lower portions for cooling
    engine coolant, each radiator portion having opposite
    front and rear faces through which ambient cooling air
    flows, opposite upper and lower ends adjacent the
    radiator portion faces, and sides adjacent the radiator
    portion faces between the upper and lower radiator
    portion ends;
  a charge air cooler having upper and lower portions for
    cooling charge air, each charge air cooler portion
    having opposite front and rear faces through which
    cooling air flows, opposite upper and lower ends adja-
    cent the charge air cooler portion faces, and sides
    adjacent the charge air cooler portion faces between the
    upper and lower charge air cooler portion ends, and
    including manifolds at the upper and lower charge air
    cooler oortion ends and charge air-carrying tubes
    extending substantially directly between the manifolds
    at the upper and lower charge air cooler portion ends,
  the upper charge air cooler portion being disposed in
    overlapping relationship and adjacent to the upper
    radiator portion with the upper and lower ends of the
    upper charge air cooler portion being oriented in the
    same direction as the upper and lower ends of the upper
    radiator portion, wherein one face of the upper radiator
    portion is disposed adjacent one face of the upper
    charge air cooler portion, such that the ambient cooling
    air may flow in series through the upper radiator
    portion and the upper charge air cooler portion,
  the lower charge air cooler portion being disposed in
    overlapping relationship and adjacent to the lower
    radiator portion with the upper and lower ends of the
    lower charge air cooler portion being oriented in the
    same direction as the upper and lower ends of the lower
    radiator portion, wherein the other face of the lower
    radiator portion is disposed adjacent one face of the
    lower charge air cooler portion, such that the ambient
    cooling air may flow in series through the lower charge
    air cooler portion and the lower radiator portion,
  the radiator portions being operatively connected such
    that the engine coolant may flow between the upper
    radiator portion and the lower radiator portion, and
  the charge air cooler portions being operatively connected
    such that the charge air may flow between the lower
    manifold of the upper charge air cooler portion and the
    upper manifold of the lower charge air cooler portion.

19. A method for cooling fluids used in an engine of a motor vehicle, comprising:
  providing a heat exchanger assembly comprising:
    a first heat exchanger having two portions for cooling
      a first fluid, each first heat exchanger portion having
      opposite front and rear faces through which ambient
      cooling air flows, opposite first and second ends
      adjacent the faces of the first heat exchanger portion,
      and sides adjacent the faces of the first heat
      exchanger portion between the first and second ends
      of the first heat exchanger portion;
    a second heat exchanger having two portions for cooling
      a second fluid, each second heat exchanger portion
      having opposite front and rear faces through which air
      flows, opposite first and second ends adjacent the faces
      of the second heat exchanger portion, and sides adja-
      cent the faces of the second heat exchanger portion
      between the first and second ends of the second heat
      exchanger portion, and including manifolds at the first
      and second ends of the second heat exchanger portions
      and fluid-carrying tubes extending substantially
      directly between the manifolds at the first and second
      ends of the second heat exchanger portions,
    one of the second heat exchanger portions being dis-
      posed in overlapping relationship and adjacent to one
      of the first heat exchanger portions with the first and
      second ends of the one of the second heat exchanger
      portions being oriented in the same direction as the
      first and second ends of the one of the first heat
      exchanger portions, wherein one face of the one of
      the first heat exchanger portions is disposed adjacent
      one face of the one of the second heat exchanger
      portions,
    the other of the second heat exchanger portions being
      disposed in overlapping relationship and adjacent to
      the other of the first heat exchanger portions with the
      first and second ends of the other of the second heat
      exchanger portions being oriented in the same direc-
      tion as the first and second ends of the other of the
      first heat exchanger portions, wherein the other face of the other of the first heat exchanger portions is disposed adjacent one face of the other of the second heat exchanger portions, the first heat exchanger portions being operatively connected such that the first fluid may flow between the second manifold of the one of the first heat exchanger portions and the first manifold of the other of the first heat exchanger portions, and the second heat exchanger portions being operatively connected such that the second fluid may flow between the second manifold of the one of the second heat exchanger portions and the first manifold of the other of the second heat exchanger portions;

flowing the first fluid through the first heat exchanger portions;

flowing the second fluid through the substantially directly extending tubes of the second heat exchanger portions and between the second manifold of the one of the second heat exchanger portions and the first manifold of the other of the second heat exchanger portions; and flowing cooling air through the heat exchanger assembly such that ambient cooling air flows in series through the one of the first heat exchanger portions and the one of the second heat exchanger portions, and ambient cooling air flows in series through the other of the second heat exchanger portions and the other of the first heat exchanger portions.

20. The method of claim 19 wherein the second fluid flows in sequence through the second manifold of the other of the second heat exchanger portions, the substantially directly extending tubes of the other of the second heat exchanger portions, the first manifold of the other of the second heat exchanger portions, the second manifold of the one of the second heat exchanger portions, the substantially directly extending tubes of the one of the second heat exchanger portions, and the first manifold of the one of the second heat exchanger portions.

21. The method of claim 19 wherein the second fluid flows in sequence through the first manifold of the one of the second heat exchanger portions, the substantially directly extending tubes of the one of the second heat exchanger portions, the second manifold of the one of the second heat exchanger portions, the first manifold of the other of the second heat exchanger portions, the substantially directly extending tubes of the other of the second heat exchanger portions, and the second manifold of the other of the second heat exchanger portions.

22. The method of claim 19 wherein the first heat exchanger is a radiator and the first fluid is engine coolant, and wherein the second heat exchanger is a charge air cooler and the second fluid is charge air, each of the radiator and the charge air cooler portions being cooled by ambient air.

23. The method of claim 19, wherein the first heat exchanger is a radiator for cooling engine coolant and the second heat exchanger is a charge air cooler for cooling charge air, and wherein:

the radiator has upper and lower portions, with each radiator portion having opposite upper and lower ends adjacent the faces of the radiator portion;

the charge air cooler has upper and lower portions, with each charge air cooler portion having opposite upper and lower ends adjacent the faces of the charge air cooler portion, and upper and lower manifolds extending across the upper and lower ends, respectively, of each charge air cooler portion, the upper charge air cooler portion being disposed in overlapping relationship and adjacent to the upper radiator portion with the upper and lower ends of the upper charge air cooler portion being oriented in the same direction as the upper and lower ends of the upper radiator portion, wherein the rear face of the upper radiator portion is disposed adjacent the front face of the upper charge air cooler portion and the upper manifold of the upper charge air cooler portion is disposed adjacent the upper end of the upper radiator portion, the lower charge air cooler portion being disposed in overlapping relationship and adjacent to the lower radiator portion with the upper and lower ends of the lower charge air cooler portion being oriented in the same direction as the upper and lower ends of the lower radiator portion, wherein the front face of the lower radiator portion is disposed adjacent the rear face of the lower charge air cooler portion and the lower manifold of the lower charge air cooler portion is disposed adjacent the lower end of the lower radiator portion, the lower end of the upper charge air cooler portion being substantially in line with and opposite the upper end of the lower charge air cooler portion, the charge air cooler portions being operatively connected by a conduit extending from the lower manifold at the lower end of the upper charge air cooler portion to the upper manifold at the upper end of the lower charge air cooler portion;

and including flowing coolant between the upper and lower radiator portions and flowing charge air through the conduit between the upper charge air cooler portion and the lower charge air cooler portion.

24. The method of claim 23, wherein the upper radiator portion and the lower charge air cooler portion are disposed substantially in a first plane, and wherein the lower radiator portion and the upper charge air cooler portion are disposed substantially in a second plane, the first and second planes being substantially parallel, and including flowing cooling air through the heat exchanger assembly such that the cooling air flows sequentially between the upper radiator portion and the upper charge air cooler portion, and the cooling air also flows sequentially between the lower charge air cooler portion and the lower radiator portion, to cool the engine coolant in the radiator portions and the charge air in the charge air cooler portions.

25. A heat exchanger apparatus comprising:

a first heat exchanger having two portions for cooling a first fluid, each first heat exchanger portion having opposite front and rear faces through which ambient cooling air flows, a pair of manifolds, and fluid-carrying tubes extending substantially directly between the manifolds of the first heat exchanger portions;

one of the first heat exchanger portions being disposed in a first plane, and the other of the first heat exchanger portions being disposed in a second plane, the first and second planes being substantially parallel, a second heat exchanger having two portions for cooling a second fluid, each second heat exchanger portion having opposite front and rear faces through which air flows, a pair of manifolds, and fluid-carrying tubes extending substantially directly between the manifolds of the second heat exchanger portions, one of the second heat exchanger portions being disposed in the second plane in overlapping relationship and adjacent to the one of the first heat exchanger portions, wherein one face of the one of the first heat exchanger portions is disposed adjacent one face of the one of the second heat exchanger portions, such that the ambient cooling air may flow in series through the one of the first heat exchanger portions and the one of the second heat exchanger portions, the other of the second heat exchanger portions being disposed in the first plane in overlapping relationship and adjacent to the other of the first heat exchanger portions, wherein the other face of the other of the first heat exchanger portions is disposed adjacent one face of the other of the second heat exchanger portions, such that the ambient cooling air may flow in series through the other of the second heat exchanger portions and the other of the first heat exchanger portions, the first heat exchanger portions being operatively connected such that the first fluid may flow between a manifold of the one of the first heat exchanger portions and a manifold of the other of the first heat exchanger portions, and the second heat exchanger portions being operatively connected such that the second fluid may flow between a manifold of the one of the second heat exchanger portions and a manifold of the other of the second heat exchanger portions.

26. The heat exchanger apparatus of claim 25 wherein the second heat exchanger portions are operatively connected such that the second fluid may flow therebetween through a conduit extending from and along the manifold of the one of the second heat exchanger portions to and along the manifold of the other of the second heat exchanger portions.

27. The heat exchanger apparatus of claim 26 including at least one stiffening member within the conduit.

28. The heat exchanger apparatus of claim 25 wherein the first heat exchanger portions are operatively connected such that the first fluid may flow between a manifold of the one of the first heat exchanger portions and a manifold of the other of the first heat exchanger portions adjacent at least one side of the first heat exchanger portions.

29. The heat exchanger apparatus of claim 25 wherein the first heat exchanger portions are operatively connected such that the first fluid may flow between a manifold of the one of the first heat exchanger portions and a manifold of the other of the first heat exchanger portions around at least one side of the second heat exchanger portions.

30. A method for cooling fluids used in an engine of a motor vehicle, comprising:
providing a heat exchanger assembly comprising:
a first heat exchanger having two portions for cooling a first fluid, each first heat exchanger portion having opposite front and rear faces through which ambient cooling air flows, a pair of manifolds, and fluid-carrying tubes extending substantially directly between the manifolds of the first heat exchanger portions;

one of the first heat exchanger portions being disposed in a first plane, and the other of the first heat exchanger portions being disposed in a second plane, the first and second planes being substantially parallel, a second heat exchanger having two portions for cooling a second fluid, each second heat exchanger portion having opposite front and rear faces through which air flows, a pair of manifolds, and fluid-carrying tubes extending substantially directly between the manifolds of the second heat exchanger portions, one of the second heat exchanger portions being disposed in the second plane in overlapping relationship and adjacent to the one of the first heat exchanger portions, wherein one face of the one of the first heat exchanger portions is disposed adjacent one face of the one of the second heat exchanger portions, the other of the second heat exchanger portions being disposed in the first plane in overlapping relationship and adjacent to the other of the first heat exchanger portions, wherein the other face of the other of the first heat exchanger portions is disposed adjacent one face of the other of the second heat exchanger portions, the first heat exchanger portions being operatively connected such that the first fluid may flow between a manifold of the one of the first heat exchanger portions and a manifold of the other of the first heat exchanger portions, and the second heat exchanger portions being operatively connected such that the second fluid may flow between a manifold of the one of the second heat exchanger portions and a manifold of the other of the second heat exchanger portions;

flowing the first fluid sequentially through the one and the other of the first heat exchanger portions;

flowing the second fluid sequentially through the one and the other of the second heat exchanger portions; and flowing cooling air through the heat exchanger assembly such that ambient cooiing air flows in series through the one of the first heat exchanger portions and the one of the second heat exchanger portions, and ambient cooling air flows in series through the other of the second heat exchanger portions and the other of the first heat exchanger portions.

* * * * *